US011960426B2

(12) United States Patent
Rao et al.

(10) Patent No.: US 11,960,426 B2
(45) Date of Patent: Apr. 16, 2024

(54) CABLE PAIR CONCURRENT SERVICING (71) Applicant: INTERNATIONAL BUSINESS MACHINES CORPORATION, Armonk, NY (US)

(72) Inventors: Rajat Rao, Bangalore (IN); Patrick James Meaney, Poughkeepsie, NY (US); Glenn David Gilda, Binghamton, NY (US); Michael Jason Cade, San Marcos, TX (US); Robert J Sonnelitter, III, Bedford Hills, NY (US); Hubert Harrer, Schoenaich (DE); Xiaomin Duan, Nufringen (DE); Christian Jacobi, West Park, NY (US); Arthur O'Neill, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 17/804,904

(22) Filed: Jun. 1, 2022

(65) Prior Publication Data
US 2023/0393999 A1 Dec. 7, 2023

(51) Int. Cl.
*G06F 13/36* (2006.01)
(52) U.S. Cl.
CPC .................... *G06F 13/36* (2013.01)
(58) Field of Classification Search
CPC .................... G06F 12/0284; G06F 13/1673
See application file for complete search history.

(56) References Cited

U.S. PATENT DOCUMENTS

| | | |
|---|---|---|
| 6,591,324 B1 | 7/2003 | Chen |
| 6,973,517 B1 | 12/2005 | Golden |
| 8,976,874 B1 | 3/2015 | Tanner |
| 9,344,146 B2 | 5/2016 | Lusted |
| 9,858,161 B2 | 1/2018 | Arroyo |

(Continued)

FOREIGN PATENT DOCUMENTS

| | | |
|---|---|---|
| CN | 104752932 A | 7/2015 |
| WO | 2019209328 A1 | 10/2019 |

OTHER PUBLICATIONS

Alnatheer, et al., "Optimal Method For Test And Repair Memories Using Redundancy Mechanism For SoC." Published Jul. 10, 2021 by MDPI. 20 pages. In Micromachines 2021, 12(7), 811; https://doi.org/10.3390/mi12070811.

(Continued)

*Primary Examiner* — Getente A Yimer
(74) *Attorney, Agent, or Firm* — Matthew Zehrer (57) ABSTRACT

Concurrent servicing of a first cable of a cable pair while a second cable of the cable pair remains operational improves multi-processor computer system availability and serviceability. A pair of processing chips in different processing drawers may continue operation by way of the second cable while the first cable is degraded or serviced. Upon the servicing of the first cable, the serviced cable may transition to a fully operational state with no interruptions to the operations between the processing drawers by way of the second cable. Since cable faults are typically more common than processing chip or processing drawer faults, identification of cable faults and the ability to maintain operations of the processing drawers connected therewith is increasingly important.

14 Claims, 6 Drawing Sheets

(56) References Cited

U.S. PATENT DOCUMENTS

| | | |
|---|---|---|
| 9,983,970 B2 | 5/2018 | Brooks |
| 10,067,842 B2 | 9/2018 | Puranik |
| 10,775,566 B2 | 9/2020 | Parsons |
| 11,137,550 B2 | 10/2021 | Chen |
| 2008/0027564 A1 | 1/2008 | Duron |
| 2008/0065874 A1 | 3/2008 | Geissler |
| 2012/0144230 A1 | 6/2012 | Buckland |
| 2013/0191605 A1* | 7/2013 | Solihin ............... G06F 12/0284 |
| | | 711/E12.001 |
| 2015/0271838 A1* | 9/2015 | Szilagyi ............ H04W 72/1263 |
| | | 370/336 |
| 2018/0054362 A1 | 2/2018 | Kakkar |
| 2018/0150419 A1* | 5/2018 | Steinmacher-Burow .................... |
| | | G06F 13/1673 |
| 2019/0327124 A1* | 10/2019 | Lai ........................... G01S 5/017 |
| 2021/0063651 A1 | 3/2021 | Sorenson |
| 2021/0248274 A1* | 8/2021 | Finkelstein ............. G06F 21/72 |

OTHER PUBLICATIONS

Fan, et al., "Cost-Quality Trade-Offs Of Approximate Memory Repair Mechanisms For Image Data." Published in 2017 by IEEE. 7 pages. In 2017 18th International Symposium on Quality Electronic Design (ISQED), 2017, pp. 438-444, doi: 10.1109/ISQED.2017.7918355.

Garro, et al., "FPGA-Based Degradation And Reliability Monitor For Underground Cables." Published Apr. 28, 2019 by Sensors. 27 pages. In Sensors 2019, 19(9), 1995; https://doi.org/10.3390/s19091995.

Lv, et al., "Efficient Repair Analysis Algorithm Exploration For Memory With Redundancy And In-Memory ECC.". Published May 2020 by Research Gate. 14 pages. In IEEE Transactions on Computers pp. (99):1-1. DOI:10.1109/TC.2020.2996747.

Su, et al., "An Integrated ECC And Redundancy Repair Scheme For Memory Reliability Enhancement." Published in 2005 by IEEE. 9 pages. In Proceedings of the 2005 20th International Symposium on Defect and Fault Tolerance in VLSI Systems.

\* cited by examiner

CABLE PAIR CONCURRENT SERVICING

BACKGROUND

Various embodiments of the present application are generally related to concurrently servicing a first cable of a cable pair while a second cable of the cable pair remains operational and communicatively connects processing drawers of a multiprocessing (MP) system.

SUMMARY

In an embodiment of the present invention, a multiprocessor computer system is presented. The system includes a first processing drawer comprising a first processing cluster comprising a first processing chip and second processing chip. The system further includes a second processing drawer comprising a second processing cluster comprising a third processing chip and fourth processing chip. The system further includes a cable pair that communicatively connects the first processing cluster to the second processing cluster. The cable pair includes a first cable that includes a first data lane group that communicatively connects the first processing chip to the third processing chip and a second data lane group that communicatively connects the second processing chip to the fourth processing chip. The cable pair further includes a second cable that includes a third data lane group that communicatively connects the first processing chip to the third processing chip and a fourth data lane group that communicatively connects the second processing chip to the fourth processing chip.

In another embodiment of the present invention, a method of concurrently servicing a first cable of a cable pair while a second cable of the cable pair remains operational and communicatively connects processing drawers of a multiprocessing (MP) system is presented. The method includes identifying a first pair of processing chips that are communicatively connected by a first data lane group operating in a degraded state comprised within a first cable that communicatively connects the first pair of processing chips. The first cable further includes a second data lane group that communicatively connects a second pair of processing chips. The method further includes identifying a third data lane group that is complementary to the first data lane group and that communicatively connects the first pair of processing chips and is comprised within a second cable that communicatively connects the first pair of processing chips. The second cable further includes a fourth data lane group complementary to the second data lane group and that communicatively connects the second pair of processing chips. The method further includes determining whether the third data lane group and fourth data lane group respectively comprise at least a threshold number of data lanes. The method further includes, if the third data lane group and fourth data lane group respectively comprise at least the threshold number of data lanes, disabling communicative connection of the first pair of processing chips through the first data lane group and disabling communicative connection of the second pair of processing chips through the second data lane group. The method further includes evacuating the first cable while simultaneously maintaining communicative connection of the first pair of processing chips through the third data lane group and communicative connection of the second pair of processing chips through the fourth data lane group.

In yet another embodiment of the present invention, a multiprocessing (MP) system is presented. The system includes a first pair of processing chips that are communicatively connected by a first data lane group comprised within a first cable that communicatively connects the first pair of processing chips. The first cable further comprising a second data lane group that communicatively connects a second pair of processing chips. The system further includes a third data lane group that is complementary to the first data lane group and that communicatively connects the first pair of processing chips and is comprised within a second cable that communicatively connects the first pair of processing chips. The second cable further includes a fourth data lane group complementary to the second data lane group and that communicatively connects the second pair of processing chips. The system further includes first interfaces that prohibit communicative connection of the first pair of processing chips through the first cable and that prohibit communicative connection of the second pair of processing chips through the first cable, when the third data lane group and fourth data lane group respectively comprise at least the threshold number of data lanes and the first data lane group is operating in a degraded state. The system further includes second interfaces that permit communicative connection of the first pair of processing chips through the second cable and that permit communicative connection of the second pair of processing chips through the second cable.

These and other embodiments, features, aspects, and advantages will become better understood with reference to the following description, appended claims, and accompanying drawings.

BRIEF DESCRIPTION OF THE DRAWINGS

In accordance with common practice, the various features illustrated in the drawings may not be drawn to scale. Accordingly, the dimensions of the various features may be arbitrarily expanded or reduced for clarity. In addition, some of the drawings may not depict all the components of a given system, method, or device. Finally, like reference numerals may be used to denote like features throughout the specification and Figures.

DETAILED DESCRIPTION

Figure 1:
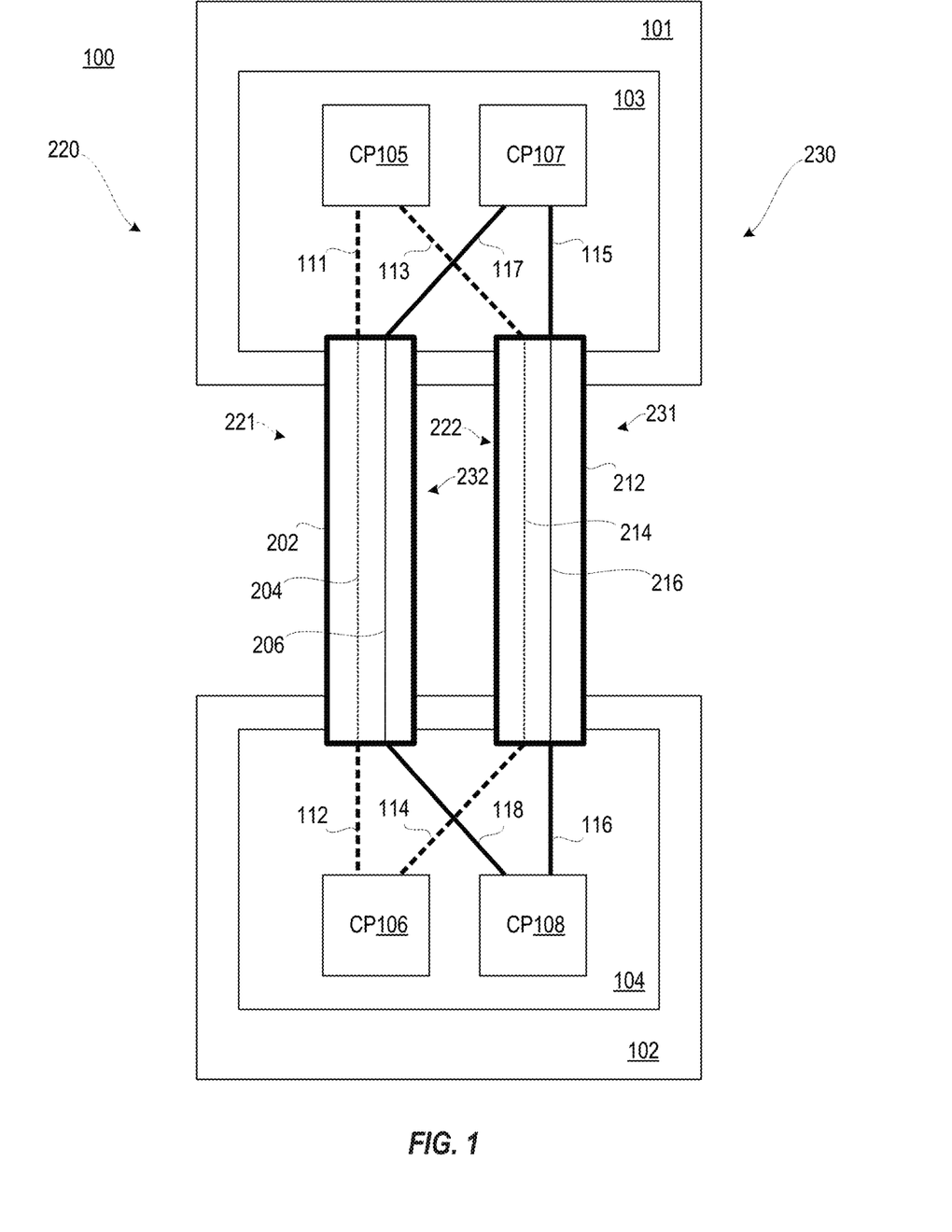
FIG. 1 depicts a block diagram of a first multi-processor (MP) cluster connected to a second MP cluster by a cable pair, according to one or more embodiments of the present invention.

FIG. 1 depicts a multiprocessor (MP) computer system 100 of interconnected processing drawer 101 and processing drawer 102. Although FIG. 1 depicts a system 100 of two interconnected processing drawers, it should be appreciated that in other embodiments a system could include any number of processing drawers.

Processing drawer 101 may include a plurality of processing chips, such as central processor (CP) 105 and CP 107. Similarly, processing drawer 102 may include a plurality of processing chips, such as CP 105 and CP 107. Two processing chips may be logically grouped and/or physically connected within a cluster. For example, as depicted, processing drawer 101 may include a cluster 103 that contains CP 105 and CP 107 and processing drawer 102 may include a cluster 104 that contains CP 106 and CP 108. Although FIG. 1 depicts processing drawer 101 and processing drawer 102 having one cluster, respectively, it should be appreciated that in other embodiments the processing drawer could include any number of clusters.

Processing drawers 101, 102, may communicate with one another by communicatively connecting a cluster of processing drawer 101 with a cluster of processing drawer 102. For example, as depicted, CP 105 and CP 107 of cluster 103 may be communicatively connected with CP 106 and CP 108 of cluster 104, respectively. Processing drawers 101, 102 may communicate with one another via a cable pair that consists of cable 202 and cable 212. Inter processing drawer 101, 102 communications may be achieved by receiving and transmitting data or signals via the internal buses and the cable pair, respectively.

A communication link 220 may communicatively connect a processing chip within processing drawer 101 with a processing chip within processing drawer 102. As depicted, communication link 220 includes communication link 221 and communication link 222 and communicatively connects CP 105 with CP 106.

Communication link 221 includes a processing drawer (PD) communication link 111 within processing drawer 101, a cable link 204 within cable 202, and a PD communication link 112 within processing drawer 102.

PD communication link 111 may include one or more internal buses within processing drawer 101, one or more interfaces within processing drawer 101, or the like, that work together to communicatively connect CP 105 with cable link 204 of cable 202. The internal buses within processing drawer 101 may conform to an industry bus specification and may be an electrical, optical, or the like, bus where signals are efficiently transferred. The one or more interfaces may include a chip-side-interface that communicatively connects CP 105 with the internal buses and may include a cable-side-interface, such as an adapter, that communicatively connects the internal buses to cable link 204 of cable 202. The one or more interfaces may contain electronic components and logic to adapt or convert received signals of one protocol and output corresponding signals of another protocol. Similarly, PD communication link 112 may include one or more internal buses within processing drawer 102, one or more interfaces within processing drawer 102, or the like, that work together to communicatively connect CP 106 with cable link 204 of cable 202. The one or more interfaces may include a chip-side-interface that communicatively connects CP 106 with the internal buses and may include a cable-side-interface, such as an adapter, that communicatively connects the internal buses to cable link 204 of cable 202.

Communication link 222 includes PD communication link 113 within processing drawer 101, cable link 214 within cable 212, and PD communication link 114 within processing drawer 102.

PD communication link 113 may include one or more internal buses within processing drawer 101, one or more interfaces within processing drawer 101, or the like, that work together to communicatively connect CP 105 with cable link 214 of cable 212. The internal buses may conform to an industry bus specification and may be any electrical, optical, or wireless bus where signals are efficiently transferred. The one or more interfaces may include a chip-side-interface that communicatively connects CP 105 with the internal buses and may include a cable-side-interface, such as an adapter, that communicatively connects the internal buses to cable link 214 of cable 212. The one or more interfaces may contain electronic components and logic to adapt or convert received signals of one protocol and output corresponding signals of another protocol. The internal buses and/or interfaces associated with PD communication link 113 may be distinct and not shared with the internal buses and/or interfaces associated with PD communication link 111. Alternatively, the internal buses and/or interfaces associated with PD communication link 113 may be shared with the internal buses and/or interfaces associated with PD communication link 111.

Similarly, PD communication link 114 may include one or more internal buses within processing drawer 102, one or more interfaces within processing drawer 102, or the like, that work together to communicatively connect CP 106 with cable link 214 of cable 212. The one or more interfaces may include a chip-side-interface that communicatively connects CP 106 with the internal buses and may include a cable-side-interface, such as an adapter, that communicatively connects the internal buses to cable link 214 of cable 212. The internal buses and/or interfaces associated with PD communication link 114 may be distinct and not shared with the internal buses and/or interfaces associated with PD communication link 112. Alternatively, the internal buses and/or interfaces associated with PD communication link 114 may be shared with the internal buses and/or interfaces associated with PD communication link 112.

Communication link 230 includes communication link 231 and communication link 232 and communicatively connects CP 107 with CP 108.

Communication link 231 includes PD communication link 115 within processing drawer 101, a cable link 216 within cable 212, and a PD communication link 116 within processing drawer 102.

PD communication link 115 may include one or more internal buses within processing drawer 101, one or more interfaces within processing drawer 101, or the like, that work together to communicatively connect CP 107 with cable link 216 of cable 212. The one or more interfaces may include a chip-side-interface that communicatively connects CP 107 with the internal buses and may include a cable-side-interface, such as an adapter, that communicatively connects the internal buses to cable link 216 of cable 212. Similarly, PD communication link 116 may include one or more internal buses within processing drawer 102, one or more interfaces within processing drawer 102, or the like, that work together to communicatively connect CP 108 with cable link 216 of cable 212. The one or more interfaces may include a chip-side-interface that communicatively connects CP 108 with the internal buses and may include a cable-side-interface, such as an adapter, that communicatively connects the internal buses to cable link 216 of cable 212.

Communication link 232 includes PD communication link 117 within processing drawer 101, cable link 206 within cable 202, and PD communication link 118 within processing drawer 102.

PD communication link 117 may include one or more internal buses within processing drawer 101, one or more interfaces within processing drawer 101, or the like, that work together to communicatively connect CP 107 with cable link 206 of cable 202. The one or more interfaces may include a chip-side-interface that communicatively connects CP 107 with the internal buses and may include a cable-side-interface, such as an adapter, that communicatively connects the internal buses to cable link 206 of cable 202.

The internal buses and/or interfaces associated with PD communication link 117 may be distinct and not shared with the internal buses and/or interfaces associated with PD communication link 115. Alternatively, the internal buses and/or interfaces associated with PD communication link 117 may be shared with the internal buses and/or interfaces associated with PD communication link 115. Similarly, shared internal buses and/or interfaces associated with PD communication links 115 and 117 may be distinct and not shared with shared internal buses and/or interfaces associated with PD communication links 111 and 113. Alternatively, the shared internal buses and/or interfaces associated with PD communication links 115 and 117 may be shared with the internal buses and/or interfaces associated with PD communication links 111 and 113.

Similarly, PD communication link 118 may include one or more internal buses within processing drawer 102, one or more interfaces within processing drawer 102, or the like, that work together to communicatively connect CP 108 with cable link 206 of cable 202. The one or more interfaces may include a chip-side-interface that communicatively connects CP 108 with the internal buses and may include a cable-side-interface, such as an adapter, that communicatively connects the internal buses to cable link 206 of cable 202.

The internal buses and/or interfaces associated with PD communication link 118 may be distinct and not shared with the internal buses and/or interfaces associated with PD communication link 116. Alternatively, the internal buses and/or interfaces associated with PD communication link 118 may be shared with the internal buses and/or interfaces associated with PD communication link 116. Similarly, shared internal buses and/or interfaces associated with PD communication links 116 and 118 may be distinct and not shared with shared internal buses and/or interfaces associated with PD communication links 112 and 114. Alternatively, the shared internal buses and/or interfaces associated with PD communication links 116 and 118 may be shared with the internal buses and/or interfaces associated with PD communication links 112 and 114.

Figure 2A:
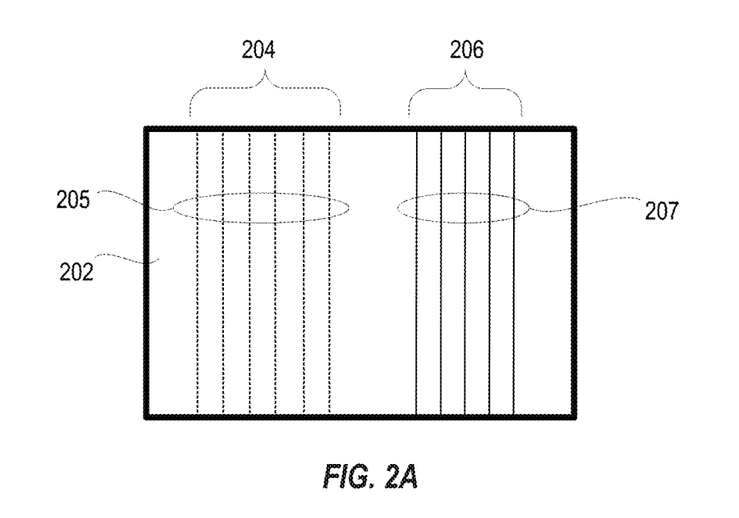
FIG. 2A and FIG. 2B depict block diagrams of data lane groups within the first cable and second cable of the cable pair, according to one or more embodiments of the present invention.
Figure 2B:
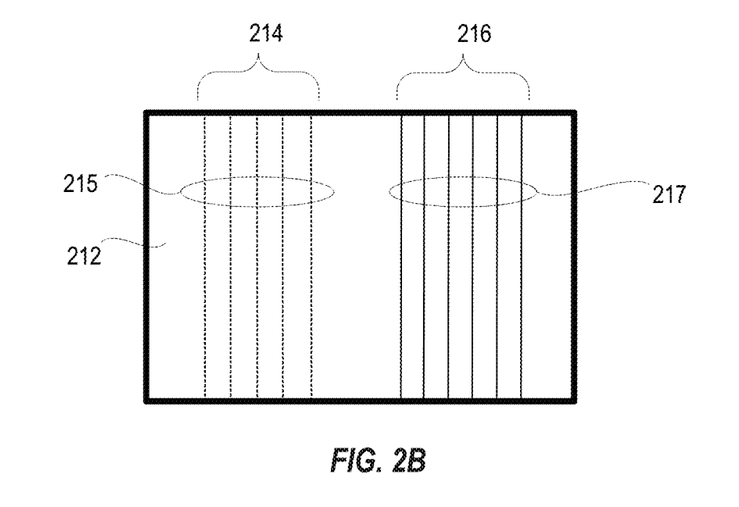

FIG. 2A depicts data lane group 205 in cable link 204 of cable 202 and data lane group 207 in cable link 206 of cable 202. FIG. 2B depicts data lane group 215 in cable link 214 of cable 212 and data lane group 217 in cable link 216 of cable 212.

Cable 202 and cable 212 each include a plurality of data lanes. A "data lane" is defined herein to be one or more electrical, optical, etc. transmission medium in which data signals are efficiently transferred. One data lane may transmit a particular data signal, at any one time. For example, one electrical data lane may transmit a "low" data signal at a first-time instance, may transmit a "high" data signal at a second-time instance. For example, one optical data lane may transmit a "low" data signal at a first-time instance, may transmit a "high" data signal at a second-time instance.

In an embodiment, a "data lane" may be implemented as a "single ended" wire or transmission medium. In an embodiment, a "data lane" may be depicted using a pair of differential wires, or nets or connections in a true-complement configuration. For instance, a logical "zero" on one data lane may be depicted as a "low" on a first differential wire of the pair and a "high" on a second differential wire of the pair. Likewise, a logical "one" may be depicted as a "high" on a first differential wire of the pair and a "low" on a second differential wire of the pair.

Data lanes within the same data lane group may each transmit independent data signal(s), relative to the other data lanes within the same data lane group. In other words, for example, the data signal transmitted by a first data lane within data lane group 205 could, but need not necessarily be influenced, dictated, because of, etc. a second data lane within data lane group 205.

In an embodiment of the present invention, the data lanes within cables 202, 212 may consist of a major data lane group and a minor data lane group. Generally, the number of data lanes within the minor data lane group is less than the number of data lanes within the major data lane group. For example, as depicted in FIG. 2A, data lane group 205 is a major data lane group, as it contains six data lanes and data lane group 207 is a minor data lane group, as it contains five data lanes. Similarly, as depicted in FIG. 2B, data lane group 217 is a major data lane group, as it contains six data lanes and data lane group 215 is a minor data lane group, as it contains five data lanes.

In such example, cable link 204 of cable 202 consists of a major data lane group, cable link 206 of cable 202 consists of a minor data lane group, cable link 216 of cable 212 consists of a major data lane group, and cable link 214 of cable 212 consists of a minor data lane group.

Due to the major data lane group within cable link 204, communication link 221 may be referred to herein as a primary communication link 221 between CP 105 and CP 106. Similarly, due to the minor data lane group within cable link 214, communication link 222 may be referred to herein as a secondary communication link 222 between CP 105 and CP 106. Likewise, due to the major data lane group within cable link 216, communication link 231 may be referred to herein as a primary communication link 231 between CP 107 and CP 108. Similarly, due to the minor data lane group within cable link 206, communication link 232 may be referred to herein as a secondary communication link 232 between CP 107 and CP 108.

In another embodiment of the present invention, a cable link within cable 202, 212 provides for normal or anticipated operational data signal transfer to associated CPs and operates in a fully operational (FO) state when all data lanes within that cable link are fully operational. For example, cable link 204 operates in a fully operational state when all data lanes within data lane group 205 are fully operational, cable link 206 operates in a fully operational state when all data lanes within data lane group 207 are fully operational, cable link 214 operates in a fully operational state when all data lanes within data lane group 215 are fully operational, cable link 216 operates in a fully operational state when all data lanes within data lane group 217 are fully operational.

In another embodiment of the present invention, a cable link within cable 202, 212 provides normal operation to associated CPs but operates in a partial operational (PO) state when less than all data lanes but greater than or equal to a predetermined minimum threshold number of data lanes are fully operational. For example, cable link 204 operates in the PO state when four or more but less than all six data lanes within group 205 are fully operational, cable link 206 operates in the PO state when four data lanes within group 207 are fully operational, cable link 214 operates in the PO state when four data lanes within group 215 are fully operational, cable link 216 operates in the PO state when four or more but less than all six data lanes within group 217 are fully operational.

In such depicted example, the predetermined minimum threshold number of data lanes within the cable links 204, 206, 214, 216 is four data lanes. In some implementations, the predetermined minimum threshold number of data lanes may be at least a minimum number of a majority of the data lanes within a major data lane group. For example, if a major data lane group consists of thirty data lanes, the predetermined minimum threshold number of data lanes is sixteen.

For clarity, a cable link that operates in a PO state may provide normal or fully operational service to/from its associated CPs. However, such cable link operates in a PO state due to the fewer than all data lanes but equal to or greater than the minimum threshold number of data lines being fully operational.

In another embodiment of the present invention, a cable link within cable 202, 212 provides degraded operation to associated CPs in a fully degraded (FD) state when less than the predetermined minimum threshold number of data lanes are operational. For example, cable links 204, 206, 214, and/or 216 operate in a fully degraded state when three or fewer data lanes within group 205, 207, 215, and 217, respectively are operational.

Figure 3:
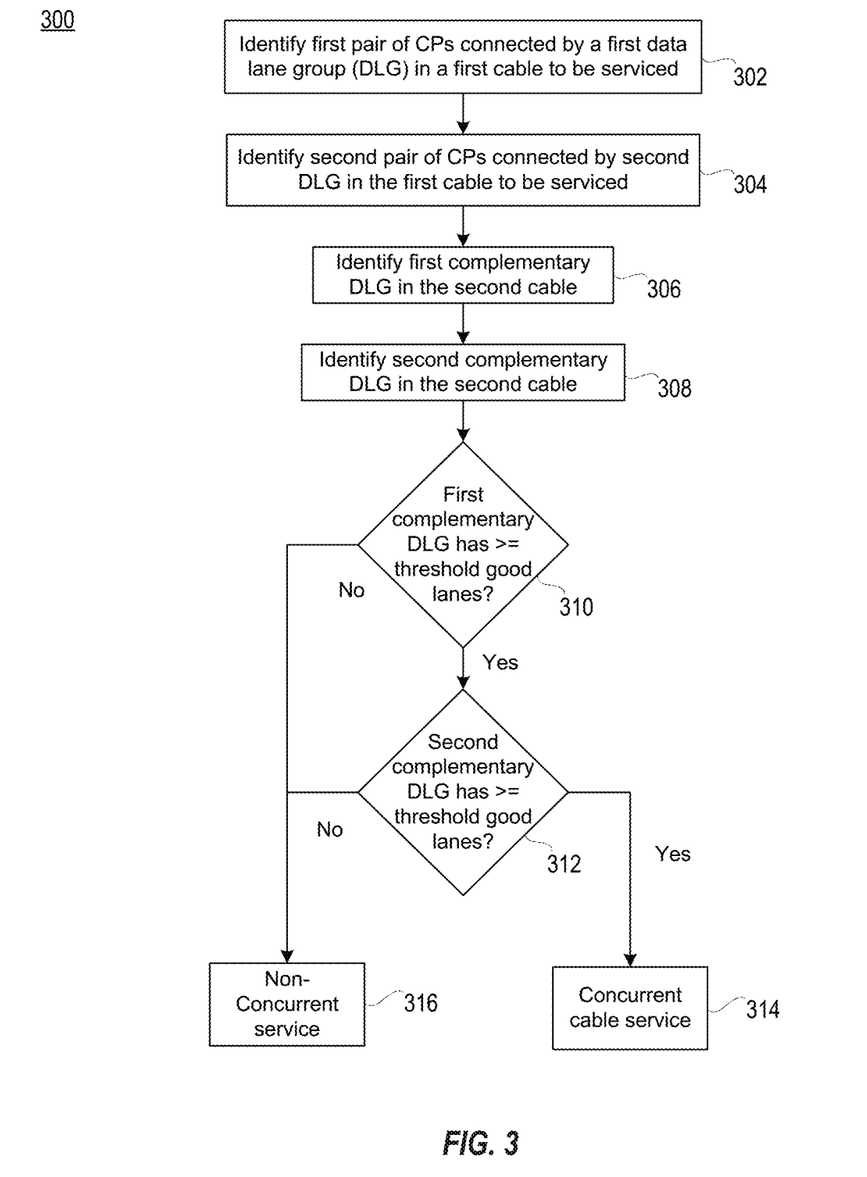
FIG. 3 depicts a flow diagram of a determining if concurrent servicing of a first cable of the cable pair is possible when the first cable is to be replaced or otherwise serviced, according to one or more embodiments of the present invention.

FIG. 3 depicts a flow diagram of a method 300 of determining if concurrent servicing of a first cable of the cable pair is possible, according to one or more embodiments of the present invention. Method 300 may be exemplarily utilized by a technician or other entity that services MP computer system 100 after such MP computer system 100 indicates that one cable link of a pair of twin cable links is operating in a degraded state (e.g., cable link 204 or link 214 is operating in a degraded state).

For clarity, one or more of the flow diagrams are exemplary described with reference to cable 202 as a reference cable that includes a cable link 204, 206 that is operating in a PO, FD state. There may be other cables that connect processing drawers within an MP computer system. For clarity, the methodologies depicted in the one or more of the flow diagrams may be utilized in parallel or in series with respect to those other cables, in addition to, or in lieu of the reference cable.

Method 300 may begin by identifying a first pair of CPs that are communicatively connected by a first data lane group in a first cable that is operating in less than the FO state and is to be, therefore, serviced (block 302). For example, CP 105 and CP 106 are identified as being communicatively connected by data lane group 205 in cable 202 that is operating in less than the FO state. Due to the present operational PO or FD overall state of data lane group 205 it may be determined that cable 202 is to be serviced.

Method 300 may continue with identifying a second pair of CPs that are communicatively connected by a second data lane group in the first cable (block 304). For example, CP 107 and CP 108 are identified as being communicatively connected by data lane group 207 in cable 202.

The different data lane groups within different cable links in the same cable may be referred herein as "twin data lane groups" and as "twin cable links", respectively. In the depicted example of FIG. 1, therefore, cable link 204 is the twin cable link of cable link 206 and cable link 214 is the twin cable link of cable link 216. Similarly, data lane group 205 is the twin data lane group of data lane group 207 and data lane group 215 is the twin data lane group of data lane group 217. In an embodiment, data lane groups can exist as independent groups of lanes within a cable without being packaged or otherwise treated as separate cable links. In an embodiment, other pluggable media connections, such as back-planes, boards, optical, electrical, or other packaging options, may be used in lieu of cables.

A complementary cable link or a complementary data lane group is defined herein as a cable link or data lane group that connects the same pair of CPs, relative to a reference cable link or data lane group, respectively, but is in a different cable relative to the reference cable link or data lane group. In the depicted example of FIG. 1, therefore, cable link 204 is the complementary cable link of cable link 214 and cable link 206 is the complementary cable link of cable link 216. Similarly, data lane group 205 is the complementary data lane group of data lane group 215 and data lane group 207 is the complementary data lane group of data lane group 217.

Method 300 may continue with identifying a first complementary data lane group to the first data lane group (block 306). For example, data lane group 215 is identified as the first complementary data lane group that is complementary to the first data lane group 205. Similarly, method 300 may continue with identifying a second complementary data lane group to the second data lane group (block 308). For example, data lane group 217 is identified as the second complementary data lane group that is complementary to the second data lane group 207.

At block 310, method 300 may continue with determining whether the first complementary data lane group has greater than or equal to the predetermined minimum threshold number of fully operational data lanes. For example, it is determined whether data lane group 215 has greater than or equal to four fully operational data lanes. If the first complementary data lane group does not have greater than or equal to the predetermined minimum threshold number of fully operational data lanes, then method 300 continues with non-concurrent servicing of the first cable (block 316).

At block 312, method 300 may continue with determining whether the second complementary data lane group has greater than or equal to the predetermined minimum threshold number of fully operational data lanes, if the first complementary data lane group does have greater than or equal to the predetermined minimum threshold number of fully operational data lanes. For example, if the data lane group 215 does have greater than or equal to four fully operational data lanes, it is determined whether data lane group 217 has greater than or equal to four fully operational data lanes.

If the first complementary data lane group and the second complementary data lane group do have greater than or equal to the predetermined minimum threshold number of fully operational data lanes, then method 300 continues with concurrent servicing of the first cable (block 314). If the first complementary data lane group does have greater than or equal to the predetermined minimum threshold number of operational data lanes but the second complementary data lane group does not have greater than or equal to the predetermined minimum threshold number of operational data lanes (block 312), then method 300 continues with non-concurrent servicing of the first cable (block 316).

The term concurrently servicing, or the like, is defined herein to be the process of servicing, such as repair, replacement, or the like of a first or reference cable that is or has communicatively connected two pairs of CPs while a second cable of the cable pair remains operational and communicatively connects the two pairs of CPs while the first or reference cable is removed and/or is being serviced.

Figure 4:
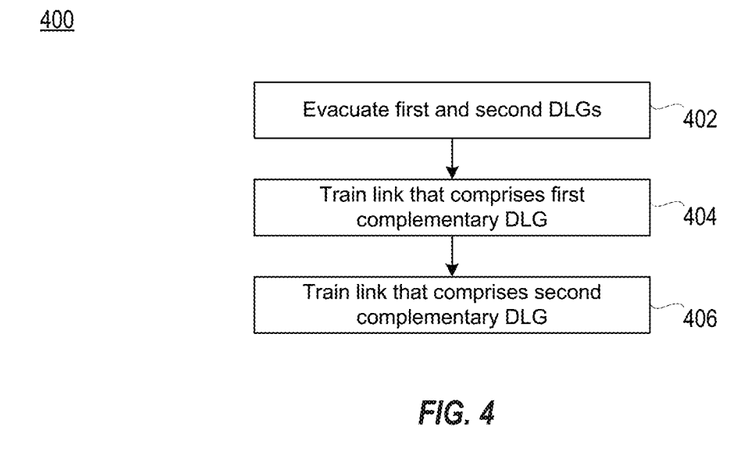
FIG. 4 depicts a flow diagram of evacuating the data lane groups of first cable and retraining the complementary data lane groups in the second cable, according to one or more embodiments of the present invention.

FIG. 4 depicts a flow diagram of a method 400 of evacuating the first cable 202 of a cable pair and retraining the links 222, 231 associated with the second cable 212, according to one or more embodiments of the present invention. Method 400 may be exemplarily utilized by a technician or other entity that services MP computer system 100.

Method 400 may begin with removing or evacuating the first cable 202 in response to determining that the cable 202 is operating in less than the FO state and that in response to determining that concurrent servicing thereof is possible (block 402). For example, CP 105, CP 106, CP 107, and CP 108 are sent an evacuation notification that traffic ordinarily sent across cable 202 should be terminated or otherwise ceased. The evacuation notification may allow the CP 105, CP 106, CP 107, and CP 108 to shut down traffic across cable 202 in an orderly or predictable manner.

Upon receipt of such evacuation notification CP 105, CP 106, CP 107, and CP may designate link 204 and associated data lane group 205 and/or may designate link 206 and associated data lane group 207 as being not used by the respective CP pairs. For example, one or more interfaces of CP 105, one or more interface(s) of CP 106, one or more interface(s) of PD communication link 111, and/or one or more interfaces of PD communication link 112, (i.e., those interfaces communicatively associated with cable link 204) may redirect, turn off, not allow, or otherwise block traffic there across over lane group 205. Similarly, one or more interfaces of CP 107, one or more interface(s) of CP 108, one or more interface(s) of PD communication link 117, and/or one or more interfaces of PD communication link 118, (i.e., those interfaces communicatively associated with cable link 206) may redirect, turn off, not allow, or otherwise block traffic there across over data lane group 207.

In one implementation, the complementary data lane groups to the evacuated data lane groups continue to transfer functional or operational data traffic without retraining the associated links. For example, the one or more interfaces of CP 105, one or more interface(s) of CP 106, one or more interface(s) of PD communication link 113, and/or one or more interfaces of PD communication link 114, (i.e., those interfaces communicatively associated with cable link 214) may automatically allow traffic there across over lane group 215 without training of the associated links. Similarly, one or more interfaces of CP 107, one or more interface(s) of CP 108, one or more interface(s) of PD communication link 115, and/or one or more interfaces of PD communication link 116, (i.e., those interfaces communicatively associated with cable link 216) may automatically allow traffic there across over data lane group 217 without training of the associated links.

Method 400 may continue with training (block 404) and designating the link 222 that includes the first complementary data lane group 215 as being used by the first CP pair that includes CP 105 and CP 106. For example, one or more interfaces of CP 105, one or more interface(s) of CP 106, one or more interface(s) of PD communication link 113, and/or one or more interfaces of PD communication link 114, (i.e., those interfaces communicatively associated with complementary cable link 214) may designate that complementary data lane group 215 shall be utilized by CP 105 and CP 106 to communicate therebetween. After such designation(s), clock lock processes, signal delay processes, training data may pass between CP 105 and CP 106, or the like to train or otherwise establish communication link 222.

Method 400 may continue with training (block 406) and designating the link 231 that includes the second complementary data lane group 217 as being used by the second CP pair that includes CP 107 and CP 108. For example, one or more interfaces of CP 107, one or more interface(s) of CP 108, one or more interface(s) of PD communication link 115, and/or one or more interfaces of PD communication link 116, (i.e., those interfaces communicatively associated with complementary cable link 216) may designate that complementary data lane group 217 shall be utilized by CP 107 and CP 108 to communicate therebetween. After such designation(s), clock lock processes, signal delay processes, training data may pass between CP 107 and CP 108, or the like to train or otherwise establish communication link 231.

For clarity, training data or training signals may be known, or otherwise predetermined reference data, known to a first CP that may be passed from the first CP to the second CP over the appropriate data lanes within communication link 220 and/or 230. Upon receipt by the second CP, the received training data may be compared against the predetermined reference data. If the received training data matches the predetermined reference data, as expected, the communication link 220, 230, and/or the data lanes therein, may be deemed fully operational.

Figure 5:
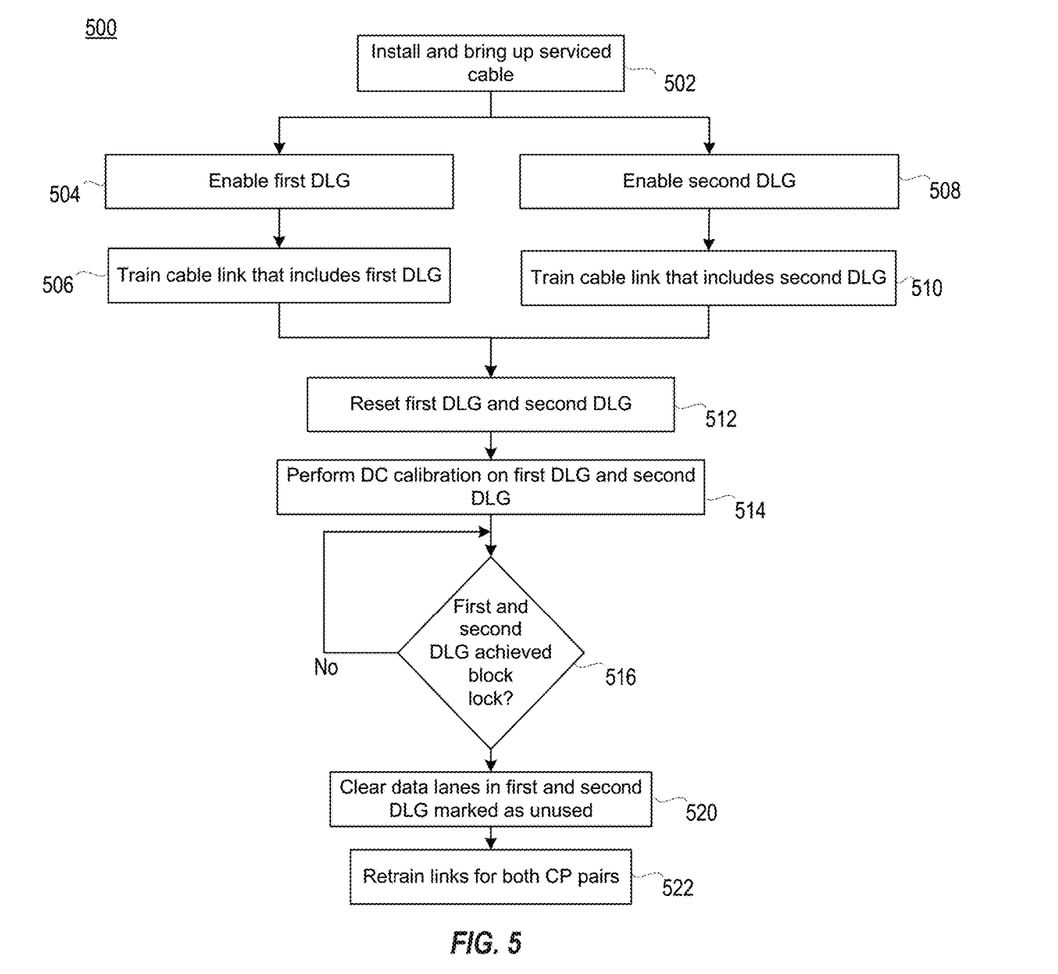
FIG. 5 depicts a flow diagram of bringing up a serviced first cable of the cable pair, according to one or more embodiments of the present invention.

FIG. 5 depicts a flow diagram of a method 500 of installing and bringing up a serviced first cable 202 of the cable pair and retraining the non-serviced cable 212 of the cable pair, according to one or more embodiments of the present invention. The term serviced cable, or the like may be defined as either a repaired cable, a replacement cable, or the like. Method 500 may be exemplarily utilized by a technician or other entity that services MP computer system 100.

At block 502, method 500 begins with installing and bring up a serviced cable in place of the removed or uninstalled cable 202. Reference to the serviced cable or features therein may be referred to with a prime denotation with reference to its element number. For example, the removed and serviced cable 202 may be referred herein as cable 202'. Cable 202' may include cable link 204', data lane group 205', cable link 206', and data lane group 207'.

Method 500 may continue with enabling data lane group 205' between CP 105 and CP 106 (block 504). For example, one or more interfaces of CP 105, one or more interface(s) of CP 106, one or more interface(s) of PD communication link 111, and/or one or more interfaces of PD communication link 112, may designate that data lane group 205' within cable link 221' may be utilized by CP 105, CP 106 to communicate therebetween.

Method 500 may continue with training link 221' that includes data lane group 205' (block 506). For example, CP 105 and/or CP 106 may be instructed, and which resultantly causes CP 105 and CP 106 to pass training data or signals upon the that data lane group 205' to train or otherwise establish data handling capabilities of communication link 221'.

Method 500 may continue with enabling data lane group 207' between the CP 107 and CP 108 (block 508). For example, one or more interfaces of CP 107, one or more interface(s) of CP 108, one or more interface(s) of PD communication link 117, and/or one or more interfaces of PD communication link 118, may designate that data lane group 207' within cable link 232' shall be utilized by CP 107, CP 108 to communicate therebetween.

Method 500 may continue with training cable link 232' that includes data lane group 207' (block 510). For example, CP 107 and/or CP 108 may be instructed, and which resultantly causes CP 107 and CP 108 to pass training data or signals upon the data lane group 207' to train or otherwise establish data handling capabilities of communication link 232'.

In some implementations, the training data may be sent over only some of the data lanes within data lane groups 205' and 207' while the other data lanes in that same data lane group 205' or 207' transmit functional or operational data signals between the associated CP pair. After a data lane has passed its training (and achieved the appropriate locks, as described, etc.) that data lane may be allowed to transmit functional or otherwise operational signals between the associated CP pair and a different data lane within the group may be trained.

Method 500 may continue with resetting data lane group 205' and data lane group 207' (block 512) and performing a direct current (DC) calibration using the data lane group 205' and data lane group 207' (block 514). The resetting the data lane group 205' and the data lane group 207' and DC calibration may be a part of a Physical Layer Protocol or Physical Layer Device (PHY) initialization or re-initialization procedure.

The resetting of data lane groups 205', 207' may ensue that any past state information associated with data lane groups 205', 207' is removed on either side of cable 202'. The DC calibration may ensure that the data that is being transmitted by data lane groups 205', 207' and being received at the appropriate CP does not have a larger than adequate DC offset. Such a DC offset may decrease the accuracy of sampling the transferred data. During the DC calibration, the bias voltage in the PHY may be changed slightly to remove the DC offset. Block 512, 514 may provide the PHY to lock to the incoming data so that it may accurately be transmitted by the cable 202'. Known feedback mechanisms in the PHY may hold the lock once achieved, as long as data bits are being received and/or transferred by the cable. Due to a relatively long duration of no data when the cable is degraded, faulted, or the like, the various portions of the PHY may wander from the previously set lock-point which may necessitate the PHY to lock to the incoming data so that it may accurately be transmitted by the cable.

Method 500 may continue with the data lane group 205' and the data lane group 207' each locking upon or becoming in sync with a respective block pattern shared by the CP 105 and CP 106, which may further be shared with CP 107 and CP 108, thereby and achieving a block lock (block 516). For example, the PHY may receive data "header" pattern which appears periodically on the bus (e.g., a fixed data header of "01" or "10" every 66 data beats on the wire, 2 bit header plus 64 bits of packet payload). In an embodiment, there is an accompanying clock that is used to capture data for lane data. In an embodiment, said clock is generated through sampling techniques creating a so-called "self-clocking" interface, which is known in the art. The PHY may be required to align with these transitions to derive the inferred clock in the system. Once the block lock is achieved, data signals may be transmitted and extracted accurately, correctly, or the like. The block lock may also result in recognition of respective boundaries of transmitted data packets. Deskewing of such transmitted data may align the transmitted data that is transmitted upon different data lanes within the same data lane group 205', 207'. During the block lock processes, data signal(s) may be bit-aligned at the CP receiver and/or may utilize placement of special sync bits in the data signal to identify the data signal starting-point(s). A data link layer may be responsible for scanning the incoming bits to find the special sync bits for data signal alignment.

In some implementations, each lane within the data lane group 205' and the data lane group 207' could have a different delay. Therefore, data transmitted by such lanes therein may be skewed when they arrive at the receiving CP, CP interface, or the like. Such block lock training may involve the deskewing or aligning of data lane data so that the data from different data lanes within the same data lane group 205' and the data lane group 207' arrives at the receiving CP, CP interface, or the like, at an adequately expected time.

In some implementations, while the data lanes within data lane group 205' and the data lane group 207' are training, the data lanes 215, 217 within cable 212 are carrying functional or operational data signals between the appropriate CP pair. The operational or functional traffic may be aligned upon those data lanes that carry functional or operational data. Using the training procedures described herein, the training data lanes are aligned. Subsequently, the training data lanes within data lane group 205', 207' may be aligned to the functional data lanes within data lane groups 215, 217. At this point, the data signals transmitted by the training data lanes may be delayed with respect to those signals transmitted by the functional data lanes, the data signals transmitted by the training data lanes may be early with respect to those transmitted by the functional data lanes, or the data signals transmitted by the training data lanes may be aligned with those transmitted by the functional data lanes.

If the respective data signals are already aligned, no further signal skew adjustments may be required. If the data signals transmitted by the training data lanes are delayed with respect to those transmitted by the functional data lanes, the functional data signals transmitted by the functional data lanes may be stalled, buffered, or the like without initiating a retrain thereto to align such data signals to those of the training data lanes. Alternatively, if the data signals transmitted by the training data lanes may be early with respect to those transmitted by the functional data lanes, the data signals transmitted by the training data lanes may be stalled, buffered to align with the data signals transmitted by the functional data lanes.

Method 500 may continue with clearing any demarcation of data lanes marked as being unused within the data lane group 205' and the data lane group 207' (block 520). At such point in method 500, all data lanes within data lane group 205' and within data lane group 207' may be ready to transmit operational or functional data signals. Block 520 may therefore indicate to CP 105, CP 106, CP 107, CP 108, etc. that the cable 202' is ready to transmit and receive functional traffic on all lanes associated with cable link 204' and cable link 206'.

Method 500 may continue with communication link 221', 232' pair retraining between the CP pairs associated with cable 202' (block 522). For example, further known communication link 221' and communication link 232' training processes may occur to establish a fully operational communication links 221', 232' within the cable 202'.

For example, a data traffic enable notification may be sent to CP 105, CP 106, CP 107, and CP 108 that may designate trained links 204', 206' and associated data lane group 205', 207' as being useable by the respective CP pairs. For example, upon receipt of such notification, one or more interfaces of CP 105, one or more interface(s) of CP 106, one or more interface(s) of PD communication link 111, and/or one or more interfaces of PD communication link 112, (i.e., those interfaces communicatively associated with cable link 204') may allow full traffic there across over all data lanes in data lane group 205'. Similarly, upon receipt of such notification, one or more interfaces of CP 107, one or more interface(s) of CP 108, one or more interface(s) of PD communication link 117, and/or one or more interfaces of PD communication link 118, (i.e., those interfaces communicatively associated with cable link 206') may allow full traffic there across over all data lanes within data lane group 207'.

Further and/or subsequent servicing methodologies may be utilized along with methods 300, 400, 500 to service MP computer system 100. For example, after cable 202' passing training and able to pass functional or operational traffic, CP 105, CP 106, CP 107, CP 108 may issue the same or new error messages. In such instances, it may be determined that one or more of the CP 105, CP 106, CP 107, CP 108 should be serviced using other known CP servicing methodologies.

For clarity, concurrent servicing of a first cable of a cable pair while a second cable of the cable pair remains operational may improve MP computer system 100 availability and serviceability. The embodiments allow for a pair of CPs in different processing drawers 101, 102 to continue operation while one cable that is degraded but still communicatively connects the processing drawers may be removed, serviced, and/or replaced. Upon the servicing of the degraded cable, the serviced cable may transition to a fully operational state seamlessly with no interruptions to the running workloads to/from the processing drawers 101, 102.

Since cable faults may be more common than CP or processing drawer issues, the embodiments allow a scheme to service such faults without having to replace the entire processing drawer, which could take many minutes to hours. Similarly, the embodiments may be used to identify a root cause of failure while the MP computer system 100 is running. Such embodiments can be used assist in identifying a failing cable to allow service engineers to replace the minimum or otherwise lower level failing unit(s), respectively.

Figure 6:
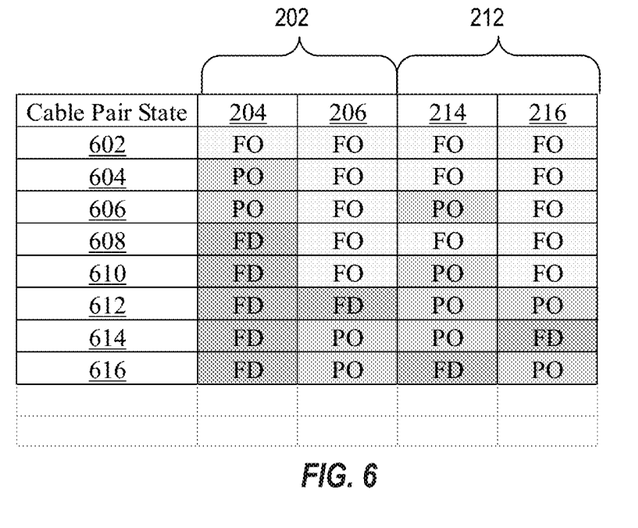
FIG. 6 depicts a table of exemplary operational states of a cable pair, according to one or more embodiments of the present invention.

FIG. 6 depicts a table of exemplary cable pair operational states of cable 202 and cable 212, according to one or more embodiments of the present invention.

In cable pair state 602, cable link 204 and cable link 206 within cable 202 and cable link 214 and cable link 216 within cable 212 are all in the FO state. As such, all data lanes within data groups 205, 206, 215, and 217 within each cable link 204, 206, 214, and 216 are fully operational.

In cable pair state 604, cable link 204 is in the PO state and cable link 206 is in the FO state within cable 202 and cable link 214 and cable link 216 within cable 212 are in the FO state. As such, less than all data lanes but greater than or equal to a predetermined minimum threshold number of data lanes within data lane group 205 are fully operational. Further, all data lanes within data lane groups 207, 215, and 217 within each cable link 206, 214, and 216 are fully operational. In this cable pair state, concurrent servicing of cable 202 or cable 212 is possible.

In cable pair state 606, cable link 204 is in the PO state and cable link 206 is in the FO state within cable 202. Similarly, cable link 214 is in the PO state and cable link 216 is in the FO state within cable 212. As such, less than all data lanes but greater than or equal to the predetermined minimum threshold number of data lanes within data lane group 205 and within data lane group 215 are fully operational. Further, all data lanes within data lane groups 207 and 217 within cable link 206 and 216, respectively, are fully operational. In this cable pair state, concurrent servicing of cable 202 or cable 212 is possible.

In cable pair state 608, cable link 204 is in the FD state and cable link 206 is in the FO state within cable 202 and cable link 214 and cable link 216 within cable 212 are in the FO state. As such, less than the predetermined minimum threshold number of data lanes within data lane group 205 are operational. Further, all data lanes within data lane groups 207, 215, and 217 within each cable link 206, 214, and 216 are fully operational. In this cable pair state, concurrent servicing of cable 202 is possible and non-concurrent servicing of cable 212 is needed.

In cable pair state 610, cable link 204 is in the FD state and cable link 206 is in the FO state within cable 202. Cable link 214 is in the PO state and cable link 216 is in the FO state within cable 212. As such, less than the predetermined minimum threshold number of data lanes within data lane group 205 are operational. Similarly, less than all data lanes but greater than or equal to the predetermined minimum threshold number of data lanes within data lane group 215 are fully operational. Further, all data lanes within data lane groups 207 and 217 within each cable link 206 and 216 are fully operational. In this cable pair state, concurrent servicing of cable 202 is possible and non-concurrent servicing of cable 212 is needed.

In cable pair state 612, cable link 204 and cable link 206 are in the FD state within cable 202. Cable link 214 and cable link 216 are in the PO state within cable 212. As such, less than the predetermined minimum threshold number of data lanes within data lane group 205 or within data lane group 207 are operational. Similarly, less than all data lanes but greater than or equal to the predetermined minimum threshold number of data lanes within data lane group 215 and within data lane group 217 are fully operational. In this cable pair state, concurrent servicing of cable 202 is possible and non-concurrent servicing of cable 212 is needed.

In cable pair state 614, cable link 204 is in the FD state and cable link 206 is in the PO state within cable 202. Similarly, cable link 214 is in the PO state and cable link 216 is in the FD state within cable 212. As such, less than the predetermined minimum threshold number of data lanes within data lane group 205 and within data lane group 217 are operational. Similarly, less than all data lanes but greater than or equal to the predetermined minimum threshold number of data lanes within data lane group 207 and within data lane group 215 are fully operational. In this cable pair state, non-concurrent servicing of cable 202 and cable 212 is needed due to one or more data lane groups operating in the FD state within each cable 202 and cable 212.

In cable pair state 616, cable link 204 is in the FD state and cable link 206 is in the PO state within cable 202. Similarly, cable link 214 is in the FD state and cable link 216 is in the PO state within cable 212. As such, less than the predetermined minimum threshold number of data lanes within data lane group 205 and within data lane group 215 are operational. Similarly, less than all data lanes but greater than or equal to the predetermined minimum threshold number of data lanes within data lane group 207 and within data lane group 217 are fully operational. In this cable pair state, non-concurrent servicing of cable 202 and cable 212 is needed due to one or more data lane groups operating in the FD state within each cable 202 and cable 212.

For clarity, other cable pair states may be possible than those depicted in described herein.

For the sake of brevity, conventional techniques related to making and using aspects of the invention may or may not be described in detail herein. Various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the quantity based upon the equipment available at the time of filing the application. For example, "about" can include a range of ±8% or 5%, or 2% of a given value.

The flowchart and block diagrams in the Figures illustrate the architecture, functionality, and operations of possible implementations according to various embodiments of the present invention. In this regard, each block in the flowchart or block diagrams may represent a one or more function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A multiprocessor computer system comprising:
    a first processing drawer comprising a first processing cluster comprising a first processing chip and a second processing chip;
    a second processing drawer comprising a second processing cluster comprising a third processing chip and fourth processing chip; and
    a cable pair that communicatively connects the first processing cluster to the second processing cluster, the cable pair comprising:
    a first cable comprising a first plurality of data lanes consisting of a first data lane group and a second data lane group, wherein the first data lane group primarily communicatively connects the first processing chip to the third processing chip and wherein the second data lane group secondarily communicatively connects the second processing chip to the fourth processing chip;
    a second cable comprising a second plurality of data lanes consisting of a third data lane group and a fourth data lane group, wherein the third data lane group secondarily communicatively connects the first processing chip to the third processing chip and wherein the flan fourth data lane group primarily communicatively connects the second processing chip to the fourth processing chip;
    wherein the first data lane group and the fourth data lane group have more data lanes relative to the second data lane group and the third data lane group, respectively;
    one or more interfaces that prohibit communicative connection through the first cable when the first data lane group is operating in a degraded state and permit communicative connection through the second cable when the third data lane group and the fourth data lane group each comprise at least a threshold number of operational data lanes, wherein the threshold number of data lanes is the smallest majority of data lanes within the fourth data lane group.

2. The multiprocessor computer system of claim 1, wherein the one or more interfaces comprise one or more first data lane group interfaces that permits and prohibits data to pass to each data lane within the first data lane group and that permits and prohibits data to pass to each data lane within the second data lane group.

3. The multiprocessor computer system of claim 2, wherein the one or more interfaces comprise one or more second data lane group interfaces that permits and prohibits data to pass to each data lane within the third data lane group and that permits and prohibits data to pass to each data lane within the fourth data lane group.

4. The multiprocessor computer system of claim 3, wherein the one or more first data lane group interfaces prohibit data to pass to each data lane within the first data lane group and prohibit data to pass to each data lane within the second data lane group and wherein the one or more second data lane group interfaces permit data to pass to each data lane within the third data lane group and permit data to pass to each data lane within the fourth data lane group.

5. The multiprocessor computer system of claim 4, wherein at least one of the one or more first data lane group interfaces and at least one of the one or more second data lane group interfaces are located in the first processing chip, the second processing chip, the third processing chip, and the fourth processing chip.

6. A method of concurrently servicing a first cable of a cable pair while a second cable of the cable pair remains operational and communicatively connects processing drawers of a multiprocessing (MP) system, the method comprising:
    identifying a first pair of processing chips that are communicatively connected by a first data lane group operating in a degraded state comprised within a first cable that primarily communicatively connects the first pair of processing chips, the first cable further comprising a second data lane group that secondarily communicatively connects a second pair of processing chips;
    identifying a third data lane group that is complementary to the first data lane group and communicatively connects the first pair of processing chips and is comprised within a second cable that secondarily communicatively connects the first pair of processing chips, the second cable further comprising a fourth data lane group complementary to the second data lane group and that primarily communicatively connects the second pair of processing chips, wherein the first data lane group and the fourth data lane group have more data lanes relative to the second data lane group and the third data lane group, respectively;
    determining whether the third data lane group and fourth data lane group comprise at least a threshold number of data lanes are operational, respectively, wherein the threshold number of data lanes is a smallest majority of data lanes within the fourth data lane group;
    disabling, in response to the third data lane group and the fourth data lane group respectively comprising at least the threshold number of data lanes, communicative connection of the first pair of processing chips through the first data lane group and disabling communicative connection of the second pair of processing chips through the second data lane group; and
    evacuating the first cable while simultaneously maintaining communicative connection of the first pair of processing chips through the third data lane group and communicative connection of the second pair of processing chips through the fourth data lane group.

7. The method of claim 6, further comprising:
    after servicing the first cable, training the first data lane group within the serviced first cable and training the second data lane group within the serviced first cable.

8. The method of claim 7, further comprising:
    after training the first data lane group and training the second data lane group within the serviced first cable, retraining the third data lane group to operate in a fully operational state and retraining the fourth data lane group to operate in a fully operational state.

9. The method of claim 8, wherein disabling communicative connection of the first pair of processing chips through the first data lane group and disabling communicative connection of the second pair of processing chips through the second data lane group comprises:
    prohibiting data to pass through the one or more data lane group interfaces to each data lane within the first data lane group and to each data lane within the second data lane group.

10. The method of claim 9, wherein the one or more data lane group interfaces comprise a plurality of first interfaces that are within the first pair of processing chips and a plurality of second interfaces that are within the second pair of processing chips.

11. The method of claim 9, wherein the one or more data lane group interfaces comprise one or more first interfaces that are within a first adapter of a first processing drawer and one or more second interfaces that are within a second adapter of a second processing drawer.

12. A multiprocessing (MP) system comprising:
    a first pair of processing chips that are communicatively connected by a first data lane group comprised within a first cable that primarily communicatively connects the first pair of processing chips, the first cable further comprising a second data lane group that secondarily communicatively connects a second pair of processing chips;
    a third data lane group that is complementary to the first data lane group and communicatively connects the first pair of processing chips and is comprised within a second cable that secondarily communicatively connects the first pair of processing chips, the second cable further comprising a fourth data lane group complementary to the second data lane group and that primarily communicatively connects the second pair of processing chips;
    wherein the first data lane group and the fourth data lane group have more data lanes relative to the second data lane group and the third data lane group, respectively;
    one or more first interfaces that prohibit communicative connection of the first pair of processing chips through the first cable and that prohibit communicative connection of the second pair of processing chips through the first cable, when the third data lane group and the fourth data lane group each comprise at least a threshold number of operational data lanes and when the first data lane group is operating in a degraded state, wherein the threshold number of data lanes is a smallest majority of data lanes within the fourth data lane group; and
    one or more second interfaces that permit communicative connection of the first pair of processing chips through the second cable and that permit communicative connection of the second pair of processing chips through the second cable.

13. The system of claim 12, wherein the one or more first interfaces comprise one or more processor interfaces that are within the first pair of processing chips and within the second pair of processing chips.

14. The system of claim 13, wherein the one or more first interfaces comprise one or more adapter interfaces that are within a first adapter of a first processing drawer and within a second adapter of a second processing drawer.

\* \* \* \* \*